(12) United States Patent
Mahadevan et al.

(10) Patent No.: US 7,974,181 B2
(45) Date of Patent: Jul. 5, 2011

(54) SYSTEMS AND METHODS FOR TRANSMIT-ONLY PEAK-TO-AVERAGE RATIO REDUCTION IN THE OVERSAMPLED REGIME USING RESERVED TONES

(75) Inventors: Amitkumar Mahadevan, Eatontown, NJ (US); Patrick Duvaut, Tinton Falls, NJ (US); Harish Jethanandani, Jaipur (IN); Rahul Garg, Faridabad (IN)

(73) Assignee: Ikanos Communications, Inc., Fremont, CA (US)

( * ) Notice: Subject to any disclaimer, the term of this patent is extended or adjusted under 35 U.S.C. 154(b) by 205 days.

(21) Appl. No.: 12/138,731

(22) Filed: Jun. 13, 2008

(65) Prior Publication Data

US 2008/0310296 A1   Dec. 18, 2008

Related U.S. Application Data

(60) Provisional application No. 60/934,630, filed on Jun. 18, 2007.

(51) Int. Cl.
*H04J 11/00* (2006.01)
(52) U.S. Cl. ......... 370/210; 370/203; 375/260; 375/295
(58) Field of Classification Search .......... 370/203–211; 375/259–260, 295–315
See application file for complete search history.

(56) References Cited

U.S. PATENT DOCUMENTS

| 7,136,423 B1 | 11/2006 | Duvaut et al. |
| 7,397,860 B1 | 7/2008 | Duvaut et al. |
| 2001/0022777 A1* | 9/2001 | Bourget et al. ............... 370/210 |
| 2008/0159421 A1* | 7/2008 | Chen et al. .................... 375/260 |
| 2008/0212694 A1* | 9/2008 | Leach et al. ................... 375/260 |

OTHER PUBLICATIONS

Wattanasuwakull et al, PAPR Reduction for OFDM Transmission by using a method of Tone Reservation and Tone Injection, Information, Communication and Signal Processing, 2005, p. 273-277.*

Sung-Eun Park, et al., "Tone Reservation method for PAPR Reduction scheme", submission to IEEE 802.16 Broadband Wireless Access Working Group, Oct. 31, 2001, pp. 0-6.

Niklas Andgart, et al., "Designing Tone Reservation PAR Reduction", EURASIP Journal on Applied Signal Processing, Jan. 2006, pp. 1-14, vol. 2006, Hindawi Publishing Corp., New York, NY.

Niklas Andgart, et al., "PSD-Constrained PAR Reduction for DMT/OFDM", EURASIP Journal on Applied Signal Processing, Jan. 2004, pp. 1498-1507, vol. 2004, Hindawi Publishing Corp., New York, NY.

(Continued)

*Primary Examiner* — William Trost, IV
*Assistant Examiner* — Charles C Jiang
(74) *Attorney, Agent, or Firm* — Thomas, Kayden, Horstemyer & Risley, LLP (57) ABSTRACT

Systems and methods for reducing the peak-to-average power ratio (PAR) at the transmitter can reduce the dynamic range required in various analog components. PAR can be reduced by applying a time-domain compensation signal in the oversampled regime, using tones reserved for PAR reduction. A set of vectors corresponding to PAR tones is generated by processing out-of-phase symbols for each PAR tone to form a span matrix. The span matrix is used to find a best fit of a desired target signal to a time-domain compensation signal comprising only PAR tones.

17 Claims, 8 Drawing Sheets

OTHER PUBLICATIONS

J.S. Chow, et al., "Mitigating clipping noise in multi-carrier systems," 1997 IEEE International Conference on Communications. ICC 97. Jun. 8-12, 1997, pp. 715-719, vol. 2, IEEE, Montreal, Canada.

D.L. Jones, "Peak power reduction in OFDM and DMT via active channel modification," Conference Record of the Thirty-Third Asilomar Conference on Signals, Systems, and Computers, Oct. 24-27, 1999, pp. 1076-1079 vol. 2, IEEE, Pacific Grove, CA.

R. Van Nee, "Reducing the peak-to-average power ratio of OFDM," 48th IEEE Vehicular Technology Conference, 1998. VTC 98, May 18-21, 1998, pp. 2072-2076 vol. 3, IEEE, Ottawa, Canada.

J. Tellado, et al., "PAR Reduction in Multicarrier Transmission Systems," Feb. 9, 1998.

J. Tellado, et al., "Revisiting DMT's PAR," Feb. 28, 1998.

* cited by examiner

FIG. 9B

SYSTEMS AND METHODS FOR TRANSMIT-ONLY PEAK-TO-AVERAGE RATIO REDUCTION IN THE OVERSAMPLED REGIME USING RESERVED TONES

CROSS-REFERENCE TO RELATED APPLICATION

Under 35 U.S.C. 119, this application claims priority to, and the benefit of, U.S. Provisional Patent Application entitled, "Transmit-Only Peak-to-Average Ratio (PAR) Reduction in the Oversampled Regime Using Reserved Tones," having Ser. No. 60/934,630, filed on Jun. 18, 2007, which is hereby incorporated by reference in its entirety.

This application is also related to commonly owned U.S. patent application entitled, "Systems and Methods for Positioning and Messaging of Reserved Tones for Peak-to-Average Ratio (PAR) Reduction in DSL Systems" having Ser. No. 12/138,657, filed on Jun. 13, 2008, henceforth referred to as the '657 application which is hereby incorporated by reference in its entirety.

BACKGROUND OF THE INVENTION

1. Field of the Invention

The invention relates to the reduction of PAR for single-carrier and multi-carrier modulation schemes in Digital Subscriber Lines (xDSL).

2. Background Information

There are many technologies which impose high bandwidth applications over existing copper wire infrastructure intended for plain old telephones (POTS) communication, such as digital subscriber line (DSL) which comes in multiple variations such as asymmetric digital subscriber line (ADSL), high bit-rate digital subscriber line (HDSL), integrated services digital network (ISDN) digital subscriber line (IDSL), symmetric digital subscriber line (SDSL), Rate Adaptive Digital Subscriber Line (RADSL) and very high bit-rate digital subscriber line (VDSL), collectively known as xDSL. ADSL allows users a higher data rate downstream (i.e., to the customer) than upstream (i.e., to the service provider).

High-bandwidth systems, including DSL systems use single-carrier modulation as well as multi-carrier modulation schemes. Both DSL and other high-bandwidth systems such as wireless use modulation schemes such as Carrier-less Amplitude and Phase modulation (CAP) and Discrete Multi-tone (DMT) for wired media and Orthogonal Frequency Division Multiplexing (OFDM) for wireless communication. One advantage of such schemes is that they are suited for high-bandwidth application of 2 Mbps or higher upstream (subscriber to provider) and up to 8 Mbps downstream (provider to subscriber). Quadrature Amplitude Modulation (QAM) utilizes quadrature keying to encode more information on the same frequency by employing waves in the same frequency shifted by 90°, which can be thought of as sine and cosine waves of the same frequency. Since the sine and cosine waves are orthogonal, data can be encoded in the amplitudes of the sine and cosine waves. Therefore, twice as many bits can be sent over a single frequency using the quadrature keying. QAM modulation has been used in voice-band modem specifications, including the V.34.

CAP is similar to QAM. For transmission in each direction, CAP systems use two carriers of identical frequency above the 4 KHz voice band, one shifted 90° relative to the other. CAP also uses a constellation to encode bits at the transmitter and decode bits at the receiver. A constellation encoder maps a bit pattern of a known length to a sinusoid wave of a specified magnitude and phase. Conceptually, a sinusoidal wave can be viewed to be in one-to-one correspondence with a complex number where the phase of the sinusoidal is the argument (angle) of the complex number, and the magnitude of the sinusoidal wave is the magnitude of the complex number, which in turn can be represented as a point on a real-imaginary plane. Points on the real-imaginary plane can have bit patterns associated with them, and this is referred to as a constellation and is known to one of ordinary skill in the art.

DMT modulation, sometimes called OFDM, builds on some of the ideas of QAM but, unlike QAM, it uses more than one constellation encoder where each encoder receives a set of bits that are encoded and outputs sinusoid waves of varying magnitudes and phases. However, different frequencies are used for each constellation encoder. The outputs from these different encoders are summed together and sent over a single channel for each direction of transmission. For example, common DMT systems divide the spectrum above the 4-kHz voice frequency band into 256 narrow channels called bins (sometimes referred to as tones, DMT tones or sub-channels). These bins are 4.3125 kHz wide. The waveforms in each bin are completely separable from one another. In order to maintain separability, the frequencies of the sinusoidal used in each bin should be multiples of a common frequency known as the fundamental frequency and in addition the symbol period $\tau$, must be a multiple of the period of the fundamental frequency or a multiple thereof. A sinusoid is often represented by a complex number. The association is based on the fact that every sinusoid can be represented as the real part of the function $ae^{j\omega t}$, where a is the complex number and $\omega$ is the frequency of the sinusoid. In accordance with the constellation encoder, the value of $a_0$ is determined by the data to be encoded and the constellation used. Suppose all the bins use frequencies that are a multiple of a fundamental frequency $\omega_0$. Then over N bins, the waveform to be encoded is $\Sigma_{n-1,\ldots,N} a_n e^{jn\omega_0 t}$, which is an equation easily implemented using an inverse Fast Fourier Transform (IFFT).

Figure 1:
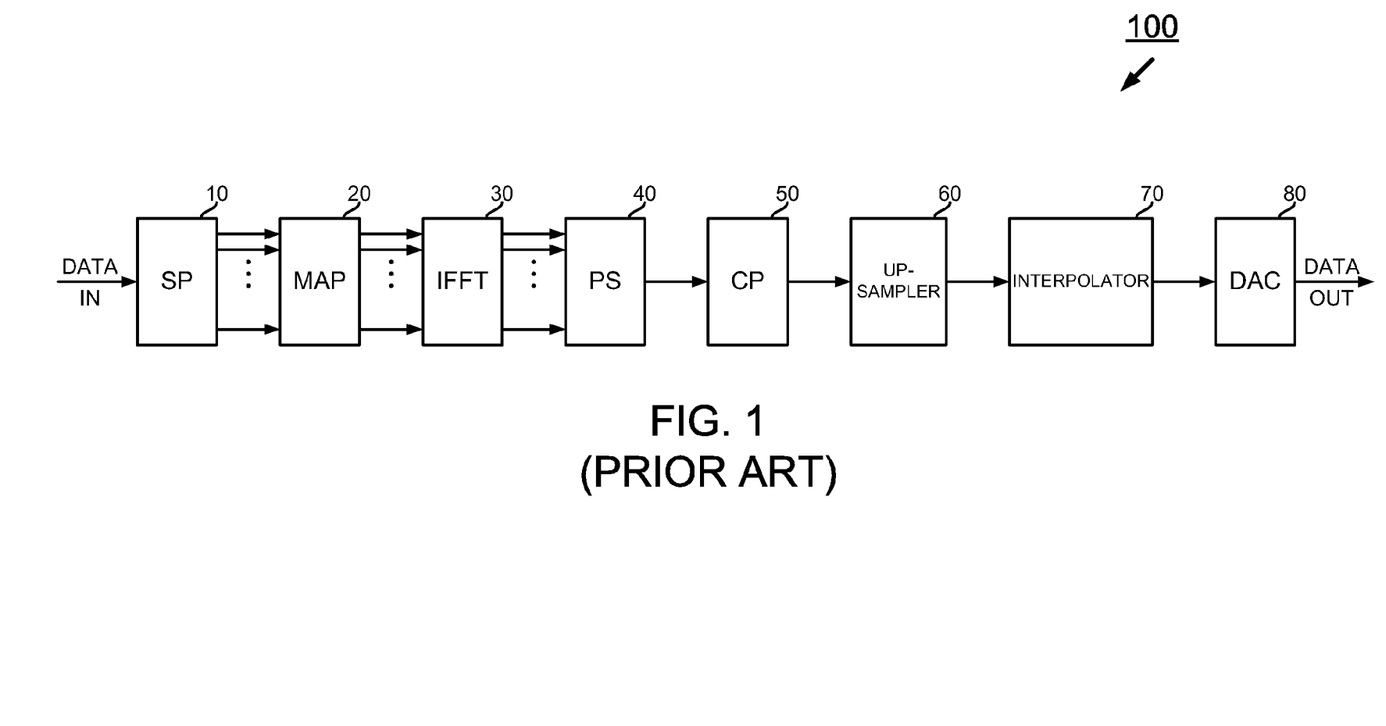
FIG. 1 shows the transmitter side of a DMT transceiver.

From a circuit standpoint, and in relation to discrete multi-tone modulation, the prior art shown in FIG. 1, is a transmitter side of a DMT transceiver. The transmitter accepts serial data which is then converted from serial to parallel form and to provide M signals, $n_0 \ldots n_M$ via a serial to parallel converter 10 (SP). The value of M depend on the standard adopted; for example, ADSL uses 256 tones (M=256), ADSL2+ uses 512 tones (M=512) and VDSL uses even more. The sequences are then passed on to a symbol-mapper 20 where each bit is assigned or mapped into one of N-complex (QAM) multi-level sub-symbols. The M symbols are complex-valued and are fed into an IFFT 30 which provides 2×M output real samples by taking the complex conjugates of the M samples. The parallel outputs of the IFFT are applied to parallel to serial converter 40 to provide a serial output signal. The output of parallel to serial converter 40 is applied to cyclic prefix block 40 which helps to make a channel circular so that equalization can occur more easily in the frequency-domain. The output of the cyclic prefix block is then up-sampled and interpolated by up-sampler 60 and interpolator 70. The output is processed by a digital-to-analog converter (DAC) 80 which converts the discrete time signal into a continuous time signal.

High amplitude peaks in the composite time signal occur when the signals from the different tones add constructively. Compared to the average signal power, the instantaneous power of these peaks is high, and consequently, so is the PAR. These large peaks require a large dynamic range of the DAC and analog front end (AFE) which results in inefficient amplifiers with excessive power dissipation and expensive transceivers. To overcome the drawbacks of the high PAR, many solutions and techniques have been proposed, one of which is tone reservation method in which a pre-selected number of tones are set aside for PAR reduction. The signal transmitted in these tones is subtracted from the data signal thus reducing the PAR, but at a cost of increased complexity at the transmitter.

Figure 2A:
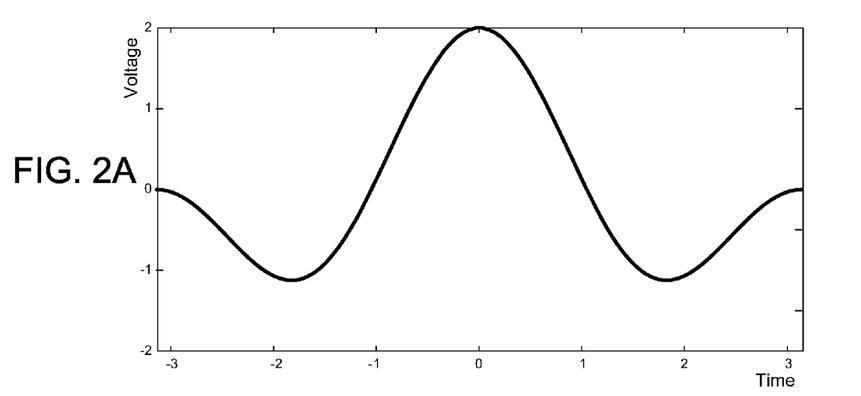
FIGS. 2A & 2B show how constructive combination of sinusoids can result in a peak.
Figure 2B:
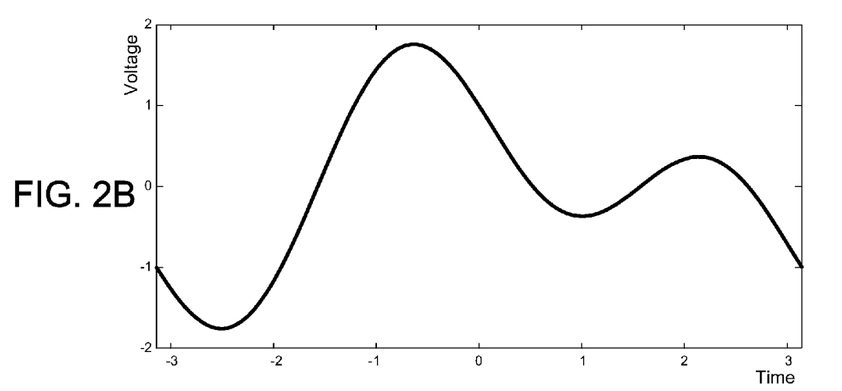
Figure 2C:
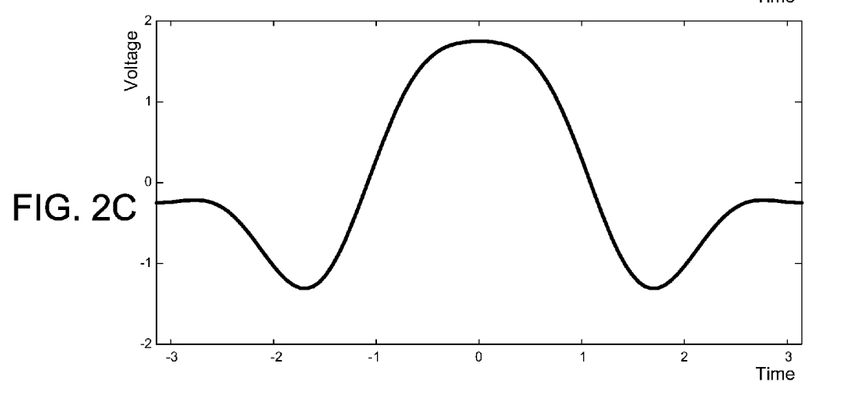
FIG. 2C shows how the addition of a sinusoid and reduce a peak.

As an example of how different tones can add constructively, a simple example of a DMT system comprising 4 bins at frequencies 1, 2, 3 & 4 is shown. FIG. 2A shows a time-domain realization of the symbol (1, 1, 0, 0). For the purposes of example here, the graphs show voltage plotted against time, but the y-axis could be any form of signal bearing quantity. The resultant form has a distinctive peak at time index 0. This peak is not necessarily characteristic of other symbols; for example, the symbol (1, j, 0, 0) does not exhibit such a characteristic peak as shown in FIG. 2B. Suppose the bin at frequency 4 is a reserved tone, the addition of the fourth tone at a power level of ¼ shows a reduction in the peak of the signal in FIG. 2A as shown in FIG. 2C. The receiver of this signal will nonetheless only interpret tones at frequencies 1, 2 and 3 for extracting data from the transmitter.

Accordingly, various needs exist in the industry to address the aforementioned deficiencies and inadequacies.

SUMMARY OF INVENTION

PAR reduction in the oversampled regime in a transmitter uses first a pre-constructed set of vectors formed by taking for each PAR reserved tones (PRT) available for PAR reduction out-of-phase and non-parallel symbols associated with the given PRT, for example, a sine symbol and a cosine symbol, and applying all digital processing including filtering, sampling and interpolation, to generate a time-domain signal in the oversampled regime which can be put in vector form. A time-domain compensation signal constructed from this set of vectors can be added to the data signal to reduce PAR in the oversampled regime. To derive the time-domain compensation signal, a desired target signal can be constructed where the desired target signal is essentially the ideal compensation signal. The application of a projection matrix derived from the set of vectors to the desired target signal insures the resultant time-domain compensation signal comprises only PRT. In a variation, the pseudoinverse of a matrix spanned by the set of vectors can be applied to the desired target signal to produce a coefficient vector; each PRT has two components in the coefficient vector associated with it. These components can be scaled in order to meet power spectral density (PSD) requirements.

Additionally, an xDSL system can comprise a cyclic prefix module, an up-sampler and an interpolation along with a PAR reduction module which can be used to reduce PAR in the oversampled regime using the methods described herein.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As mentioned above, in the background section, the addition of reserved tones can be used to mitigate the peaks in order to reduce the PAR of the transmission of a particular symbol. While reserved tones for PAR reduction, known as PRT have been used in the past to construct a time-domain compensation signal, novel techniques are set forth in the following. There are two aspects to effective PAR reduction. The first aspect is the choice of the PRT. The second aspect is constructing the time-domain compensation signal once the PRT are reserved.

It should be noted that generally, in the example of an xDSL case, the use of PRT is more applicable in the downstream direction from the central office (CO) to the consumer premises equipment (CPE) especially in the asymmetric case, primarily because the downstream direction utilizes more tones, hence is more likely to develop larger peaks and have more tones available to reserve as PRT. However, one of ordinary skill would recognize that the systems and methods described can be applicable to the upstream communications as well. Additionally, the systems described herein can as readily be implemented in hardware as circuits, hardware with firmware or software.

With regard to the first aspect, in order to avoid interference with tones allocated for data, PRT should be tones not used for data. There are several approaches to the reservation of tones. Out-band tones, which are tones lying outside the tones designated as usable by the data signal, can be used. These tones typically occupy the frequencies above the highest tone used for data signals. When the time-domain compensation signal for PAR reduction is applied immediately after the IFFT, the number of available out-band tones is dependent on the number of tones allowed by the IFFT size (which is half the IFFT size) and the highest tone used for data signals. Several xDSL systems may use the minimum required IFFT size (which is usually the smallest power of 2 higher than twice the highest tone used for the data signal) in order to limit the computational resources. For example, in ADSL2+ the highest used tone for downstream is tone 511. Consequently, an IFFT size of 1024 suffices, resulting in a complete absence of available out-band tones for PAR mitigation. The use of tones higher than half the IFFT size for generating the time-domain compensation signal immediately after the IFFT is not suitable since the signal on these tones interferes with the signal on tones at lower frequencies due to aliasing.

Out-band tones usually cannot be used to construct the time-domain compensation signal for performing PAR mitigation immediately after the IFFT in systems where the minimally required IFFT size is used. Furthermore, such systems also usually employ time-domain oversampling techniques in order to increase the sampling rate before digital-to-analog conversion. The use of filters inherent in time-domain oversampling techniques results in an increase in the PAR of the signal due to the peak-regrowth phenomenon. Peak-regrowth can be easily understood if one realizes that filtering involves performing a linear combination of several time-samples at the input to the filter leading to the Gaussianization of the time-samples in the filtered signal. As the objective is maximal peak reduction prior to digital-to-analog conversion, we need to either apply the time-domain compensation signal after the time-domain oversampling operation, or altogether avoid time-domain oversampling operations.

A novel approach to implementing PAR reduction that can potentially avoid time-domain oversampling is to employ a frequency-domain oversampling technique, which also makes a large number of out-band tones available for PAR reduction. Frequency-domain oversampling involves the use of an IFFT of size $2^k N$, where N is the minimally required IFFT size and k is a small positive integer. In practice, k=1 is often used. With frequency-domain oversampling, all components down stream from the IFFT would have to accommodate the larger number of samples, thus requiring additional computational resources. By using this frequency-domain technique, out-band reserve tones can be used for PAR reduction, and the time-domain compensation signal can be added immediately after the IFFT without any fear of peak-regrowth since time-domain oversampling is not necessary, thanks to the already higher sampling rate achieved by frequency-domain oversampling. Fortunately, under several implementations of various xDSL systems, the receivers are already equipped to perform frequency-domain oversampling. For example, this approach is exhibited in some 4-band VDSL embodiments where an 8192-point IFFT is used but the highest loaded tone is 1971, which would only require a 4096-point IFFT. An oversampling factor of two times is common. In such a system, out-band signals of less than twice the highest frequencies supported by the IFFT size can be used as out-band reserve tones.

The alternative to out-band PRT is in-band PRT where some of the reserved tones occupy the tones normally used for transmitting data. However, by reserving in-band tones, there are fewer tones to carry data thereby reducing the data rate. There are a number of factors to be considered in the reservation of PRT. In order to minimize the impact on the data rate, it is desirable to reserve tones which have the least ability to carry data or suspected of being the least able. Often this corresponds to the highest frequency tones as those tones are more likely to encounter more attenuation. Since the transmission of a time-domain compensation signal is for the benefit of transmitter components, such as the DAC, it doesn't matter if the time-domain compensation signal is severely attenuated when it is received at the receiver as the receiver will disregard the signal. Another consideration in the reservation of PRT is to reserve tones that are suitable for constructing a time-domain compensation signal. For example, in some of the techniques described below, a base compensation signal is constructed first having a single large or predominant peak with secondary peaks made as small as possible. In the ideal case, an impulse is desirable, but an impulse would require contributions from all tones which would render all tones unavailable to carry data. So a compromise solution might be to reserve tones based on a uniformly random selection. Within the in-band tones, there can be upper frequency tones and in-medley tones as described below.

Figure 3:
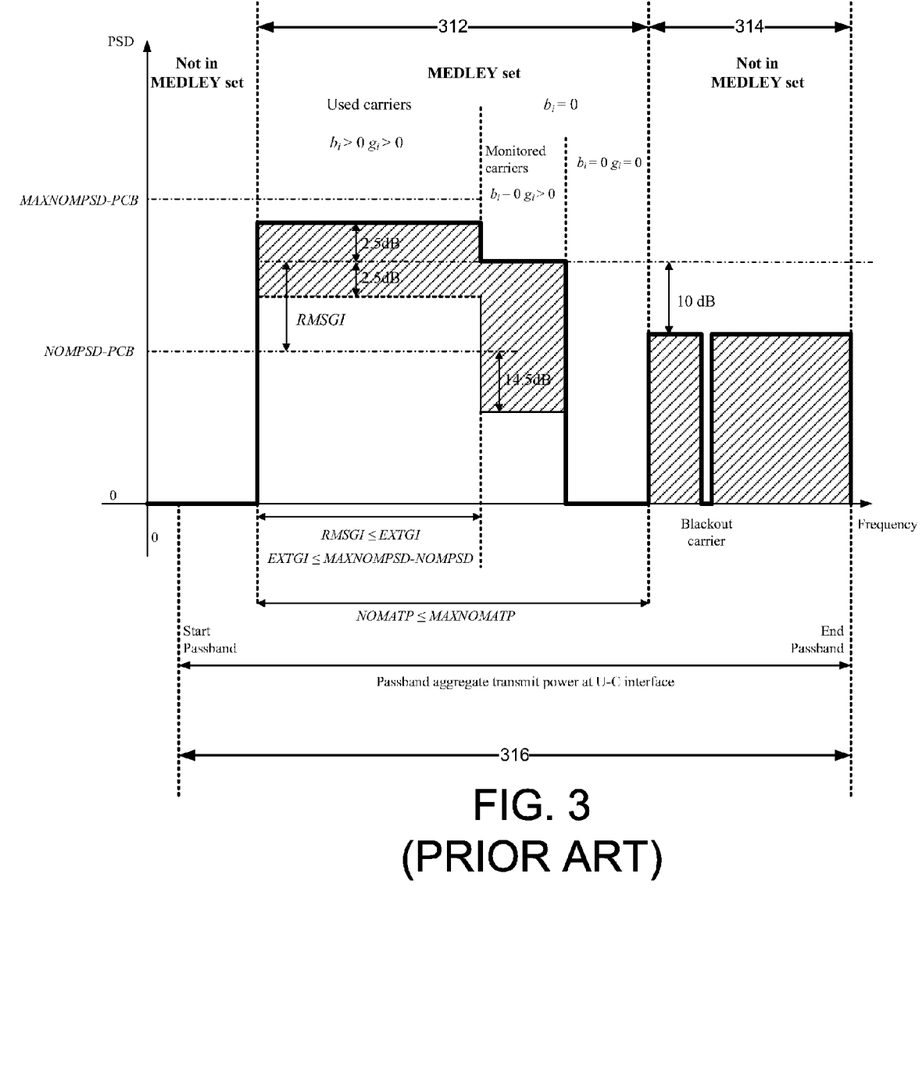
FIG. 3 shows an exemplary power spectrum for an xDSL transmission.

FIG. 3 shows an exemplary power spectrum for an xDSL transmission. The entire passband 316 for downstream xDSL communications is shown. The MEDLEY set 312 is a contiguous range of frequencies allocated for the transmission of data. The upper frequency band 314 is shown above the MEDLEY set. In order to comply with the standards, the PSD of tones lying outside the MEDLEY set must be at least 10 dB or an order of magnitude lower. There may be further constraints on the tones; for example, some tones are blacked out making them unusable. The upper frequency tones are selected from the upper frequency band. The in-medley tones are selected from within the MEDLEY set. According to many xDSL standards, any tone from the MEDLEY set not used for transmission of data must transmit a pseudo-random bit sequence (PRBS).

The use of upper frequency tones has advantages such as low impact on the overall data rate and standard compliance, but has disadvantages such as a poorer compensation signal and a forced 10 dB attenuation. However, the use of in-medley tones has advantages such as superior PAR reduction, but disadvantages such as standard non-compliance and greater impact on overall data rate.

In a typical startup sequence, during a handshake the transmitter sends a MEDLEY set, which is usually determined based on the attenuation each tone experiences. The attenuation can be derived from estimating the loop length and using a look up table to estimate the rate loss. If the rate loss is too great, the tone is unusable and will not be used in the MEDLEY set. After the MEDLEY set is transmitted, power levels are measured at the receiver for each tone in the MEDLEY set. Based on the power levels received, the receiver can determine how many bits per tone (notated as $b_i$) each tone can carry. Once the transmitter and receiver have agreed on the number of bits per tone, the startup sequence is complete and the transmitter sends data on each tone in the MEDLEY set in accordance with a predetermined constellation for the number of bits available.

As mentioned in the background section, there are several aspects of using reserved tones in PAR reduction. The method of selection and reservation of tones with regard to the data rate loss, standard compliance interoperability are addressed in the '657 application This application offers solutions to how reserved tones can be used to reduce PAR. In summary, a base compensation signal is created from the reserved tones with the signal exhibiting a predominant peak. That peak is then cyclically shifted and added to the data signal until either the signal meets the PAR reduction requirements or the computational resources to do so have been exhausted. The solution essentially inserts a PAR reduction module after IFFT 30. This is shown in FIG. 4 with the addition of PAR reduction module 402.

Figure 4:
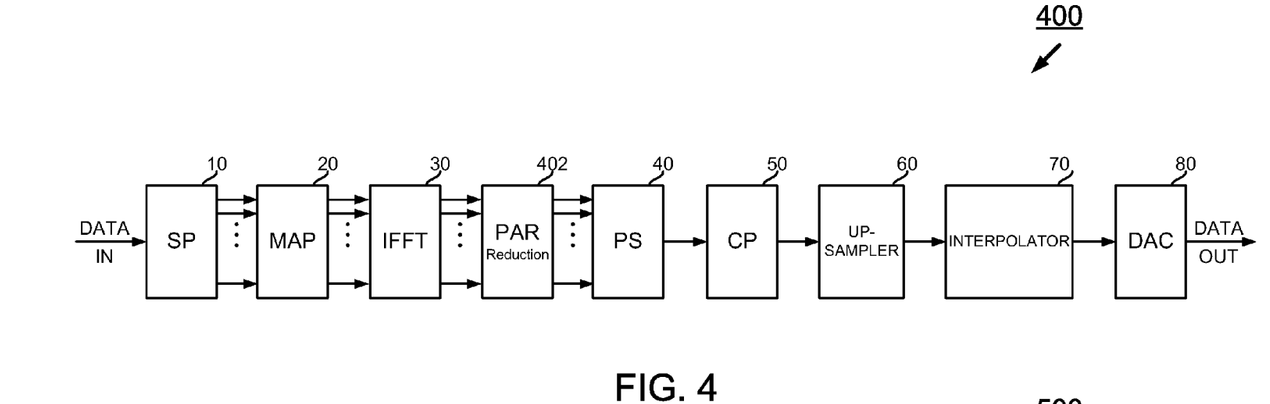
FIG. 4 shows the transmitter side of a DMT transceiver with PAR reduction taking place prior to the up-sampling and interpolation (henceforth referred to as the base-sample-rate regime)
Figure 5:
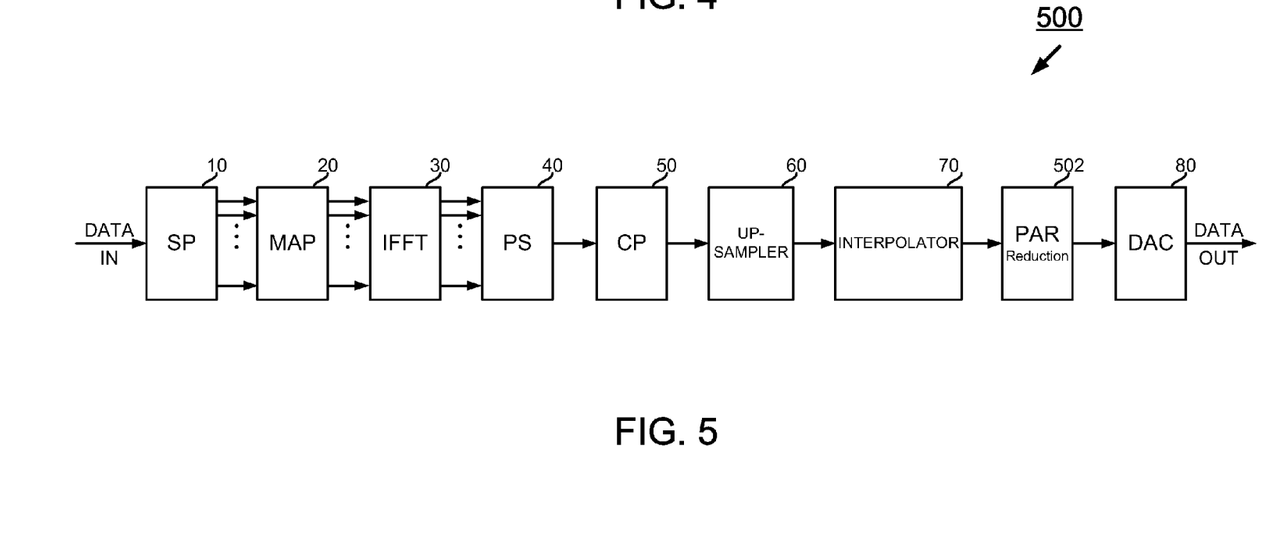
FIG. 5 shows the transmitter side of a DMT transceiver with PAR reduction taking place after the up-sampling and interpolation (henceforth referred to as the oversampled regime)

While the solution exhibited in FIG. 4 can be effective in reducing PAR, generating a time-domain compensation signal in the base-rate regime can still result in excessive PAR in the oversampled regime. Specifically, a peak that has been reduced in the base-rate regime can re-emerge in the oversampled regime due to digital filtering such as by interpolator 70 and re-sampling such as performed by up-sampler 60. Additionally, the possibility to inject a signal after the IFFT is not always available. In some circumstances such as in a pre-existing digital circuit, it may not be possible to alter the data signal until after interpolator 70. Although the components between the IFFT and the DAC are linear, they are not shift-invariant, therefore the approach of producing a base compensation signal to individually cancel each peak by shifting the base compensation signal does not work in this oversampled regime (so called because the initial data is up-sampled by up-sampler 60 and filtered by interpolator 70).

As mentioned in the background section, there are several aspects of using reserved tones in PAR reduction. The method of selection and reservation of tones with regard to the data rate loss, standard compliance interoperability are addressed in the '657 application. This application offers solutions to how reserved tones can be used to reduce PAR. In summary, a base compensation signal is created from the reserved tones with the signal exhibiting a predominant peak. That peak is then cyclically shifted and added to the data signal until either the signal meets the PAR reduction requirements or the computational resources to do so have been exhausted. The solution essentially inserts a PAR reduction module after IFFT 30. This is shown in FIG. 4 with the addition of PAR reduction module 402.

Figure 6:
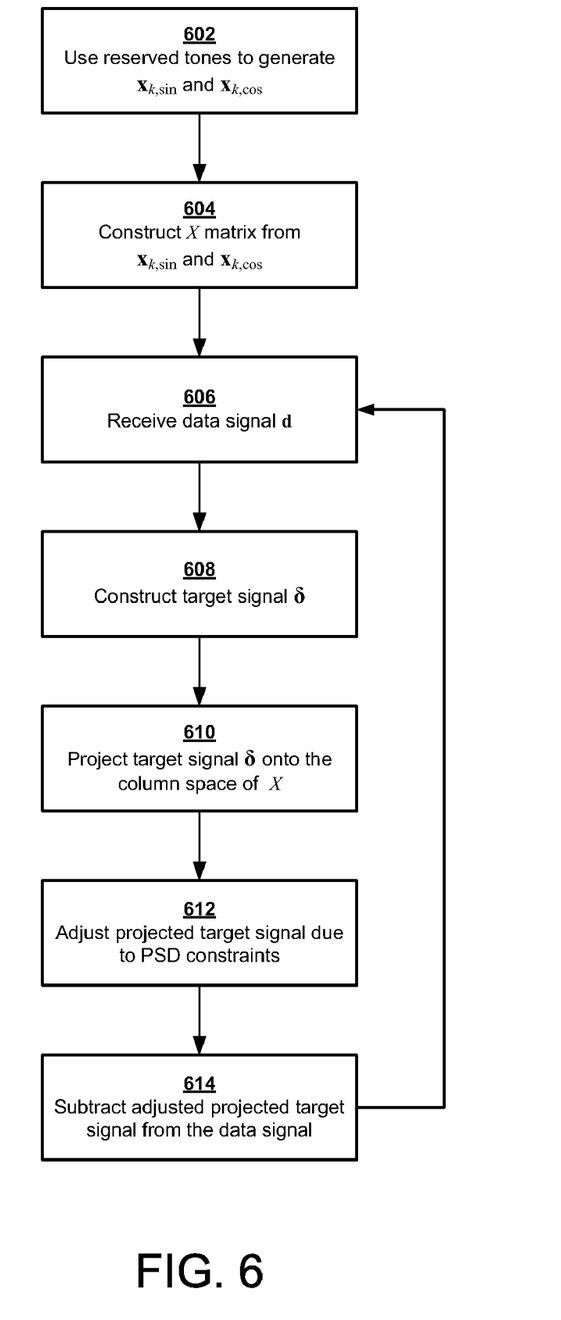
FIG. 6 is a flowchart illustrating, in overview, the method for PAR reduction used by PAR reduction module 502.

FIG. 6 is a flowchart illustrating in overview, the method for PAR reduction used by PAR reduction module 502. At step 602, two vectors are determined for each reserved tones by sending two non-parallel and preferably perpendicular symbols for that tone (for example, 1 and j, which correspond to sine and cosine in the time domain) through IFFT 30, CP 40, PS 50, up-sampler 60 and interpolator 70. Using the example of 1 and j, the two vectors for tone k can be represented as $x_{k,sin}$ and $x_{k,cos}$. At step 604, a span matrix X is constructed using $x_{k,sin}$ and $x_{k,cos}$ as columns, i.e., $X=[x_{1,sin}, x_{1,cos}, x_{2,sin}, x_{2,cos}, \ldots, x_{q,sin}, x_{q,cos}]$, where $1, \ldots, q$ denote the labels of the PRT tones. At step 606, a data signal d is received. At step 608, a desired target signal $\delta$ is derived from d. There are several approaches to deriving the desired target signal which are described below. The desired target signal is an ideal time-domain compensation signal. At step 610, the desired target signal $\delta$ is projected onto the column space of the matrix X to obtain a signal $\hat{\delta}$. It is well known in the art that $\hat{\delta}$ is the closest fit of linear combinations of $x_{k,sin}$ and $x_{k,cos}$ to $\delta$ in terms of mean square error (see G. Strang, *Linear Algebra and its Applications*, Chapter 3, Academic Press, 1980, pp. 103-152). The projection is achieved using the projection matrix $X(X^TX)^{-1}X^T$ that is $\hat{\delta}=X(X^TX)^{-1}X^T\delta$. At step 612, optionally, signal $\hat{\delta}$ may be adjusted to insure it meets PSD constraints. At step 614, the signal $\hat{\delta}$ is subtracted from data signal d. The process can then repeat again at step 606.

Figure 7:
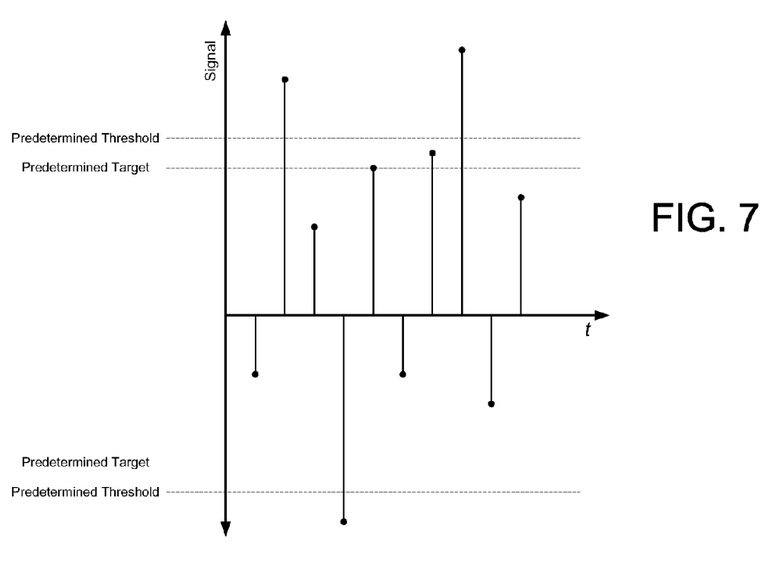
FIG. 7 shows an example data signal.

There are many approaches to generating the desired target signal at step 610. FIG. 7 shows an example data signal d with the dashed lines indicating a predetermined threshold and a predetermined target threshold. Several samples exceed the predetermined threshold.

Figure 8A:
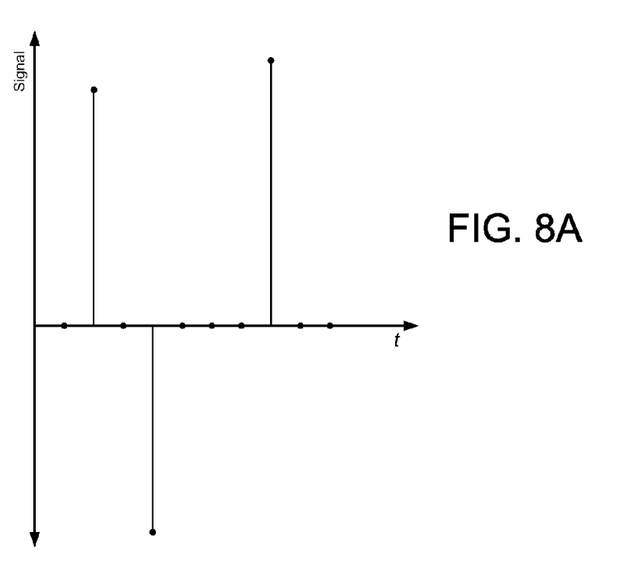
FIGS. 8A, 8B, and 8C are illustrative of one approach to generating the desired target signal.
Figure 8B:
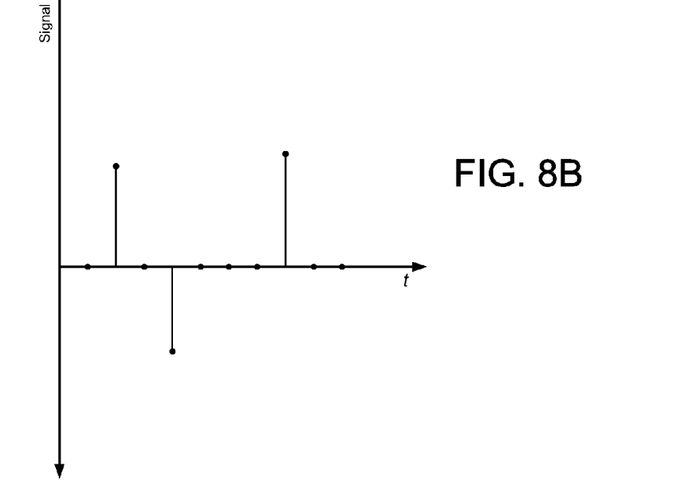
Figure 8C:
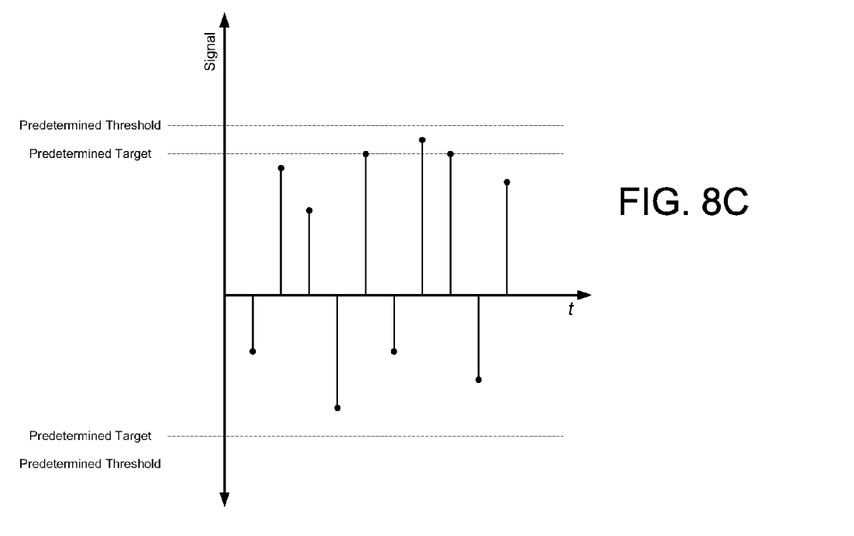

FIGS. 8A, 8B, and 8C are illustrative of one approach to generating the desired target signal. In FIG. 8A, an intermediate desired target signal $\delta'$ is produced comprising samples of the data signal that exceed the predetermined threshold and is otherwise zero. The intermediate desired target signal is scaled to form the derived target signal $\delta$ as shown in FIG. 8B. The scale factor used should be chosen to be sufficient to reduce all samples exceeding the predetermined threshold to a magnitude less than the predetermined target. Additionally, the scale factor can also be chosen to insure the PSD constraints are met. The result of the application of the desired target signal to the data signal is shown in FIG. 8C, where the graphs shows the data signal after the desired target signal has been subtracted.

Figure 9A:
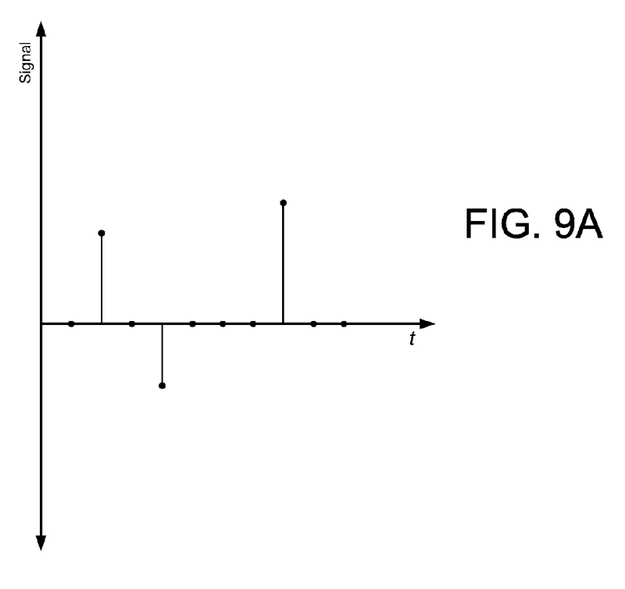
FIGS. 9A and 9B are illustrative of another approach to generating the desired target signal.
Figure 9B:
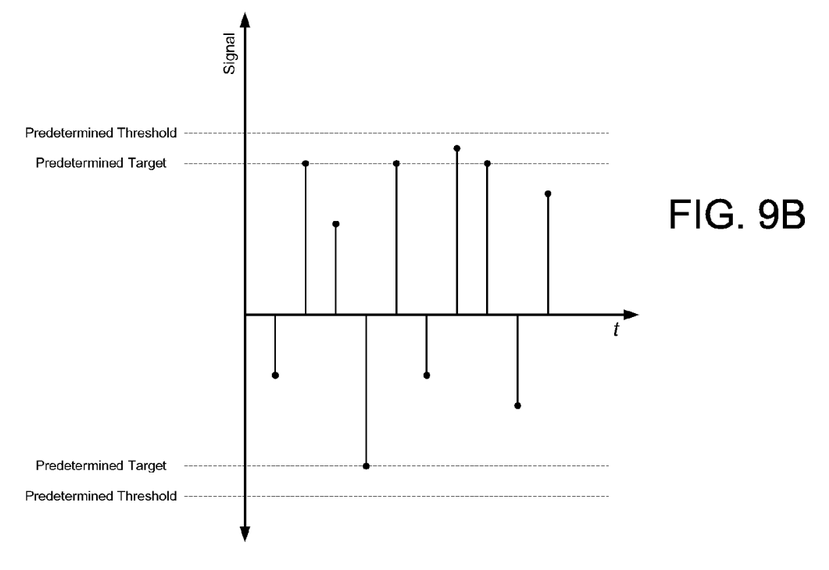

FIGS. 9A and 9B are illustrative of another approach to generating the desired target signal. The target signal is set to zero for all samples except those exceeding a predetermined threshold. For those samples exceeding the predetermined threshold, a value equal to the difference between the data signal sample and the predetermined target is used. These values can further be scaled to insure the PSD constraints are met. The target signal derived in this manner is shown in FIG. 9A. The result of the application of the desired target signal to the data signal is shown in FIG. 9B, where the graphs shows the data signal after the desired target signal has been subtracted.

At step 612, signal $\hat{\delta}$ may be adjusted to insure it meets PSD constraints by first constructing the vector $a=X(X^TX)^{-1}X^T\delta$, so $\hat{\delta}=X$ a, or in expanded form, $\hat{\delta}=a_{1,sin}x_{1,sin}+a_{1,cos}x_{1,cos}+a_{2,sin}x_{2,sin}+a_{2,cos}x_{2,cos}+\ldots+a_{q,sin}x_{q,sin}+a_{q,cos}x_{q,cos}$. From the expanded equation it is clear that if $\|a_{k,sin}x_{k,sin}+a_{k,cos}x_{k,cos}\|$ for a given tone exceeds its PSD constraint, $a_{k,sin}$ and $a_{k,cos}$ can be scaled so that the PSD constraint for that tone is met. More specifically, both values can be scaled proportionally. The result of the adjusted vector a' results in a new signal $\hat{\delta}=Xa'$ which meets PSD constraints.

In practice, the application of the matrices $X(X^TX)^{-1}X^T$, or $(X^TX)^{-1}X^T$ requires the consideration of various factors including speed (number of multiplications) and storage capacity. Assuming that each DMT symbol period has N samples, the matrix X is a N×2q matrix and N>>q. If the projection matrix $X(X^TX)^{-1}X^T$ is precalculated, the storage of an N×N would need to be stored and would probably result in the need for a large number of multiplications and would not enable the execution of optional step 612. The more practical alternatives are to either store the matrix X and its pseudoinverse $X^+=(X^TX)^{-1}X^T$ of sizes N×2q and 2q×N, respectively, or the matrix X and $(X^TX)^{-1}$ of sizes N×2q and 2q×2q, respectively. The first option affords fewer multiplications but requires more storage, and the latter option affords less storage but requires more multiplications. In addition, while the projection matrix is large it is of sparse rank and there many representations that can optimize the storage and number of calculations. Another factor in optimization is that the desired target signal $\delta$ is predominantly zero. Because the X matrix and other derivative matrices need only be calculated initially, one of ordinary skill will no doubt find other optimizations to both storage and calculations.

Systems and methods for reserving and selecting tones for PAR reduction as disclosed in '657 application can be used with the PAR reduction method disclosed above. Furthermore, the adaptive system of tone reservation also disclosed in '657 application can also be used in conjunction with the PAR reduction method disclosed above.

Furthermore, the adaptive system disclosed in the '657 application can be used here. In summary, the adaptive system selects from a plurality of sets of reserved tones for PAR reduction, and each set varies in the number of tones. The choice of which of the plurality of sets of reserved tones to be used is based on an estimate of how many tones would be needed to satisfactorily reduce the PAR. To apply this adaptive method to the oversampled regime as described above, a matrix X and associated derived matrices would have to be calculated for each set of reserved tones within the plurality of sets of reserved tones. The additional steps required to integrate the adaptive method to operate in the oversampled regime would no doubt be apparent to one of ordinary skills.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed:

1. A method for reducing peak-to-average power ratio (PAR) in a data signal comprising:
   constructing, by a transmitter, a time-domain compensation signal from a plurality of vectors generated from PAR reduction tones (PRT), wherein each PRT generates two of the plurality of vectors, wherein constructing a time-domain compensation signal comprises constructing a desired target signal, wherein subtracting the desired target signal from the data signal results in a signal having a lower PAR than the data signal; and
   applying the time-domain compensation signal to the data signal after the data signal has been digitally filtered and re-sampled, wherein each vector in the plurality of vectors is generated from one of two out-of-phase symbols associated with a PRT, wherein the one of two out-of-phase symbols associated with the PRT is processed into a time-domain signal and digitally filtered and re-sampled to generate a corresponding vector.

2. The method of claim 1 wherein the two out-of-phase symbols comprise a sine symbol and a cosine symbol associated with the PRT.

3. The method of claim 1, wherein the constructing a time-domain compensation signal further comprises multiplying a projection matrix, P, with the desired target data signal to produce the time-domain compensation signal, wherein the projection matrix is generated from the plurality of vectors.

4. The method of claim 3 wherein $P=X(X^TX)^{-1}X^T$, where X is a span matrix having the plurality of vectors as its columns.

5. The method of claim 1, wherein the constructing a time-domain compensation signal further comprises:
   multiplying a pseudoinverse of a span matrix with the desired target signal to generate a coefficient vector having a plurality of components with a pair of components corresponding to a PRT, wherein the span matrix has the plurality of vectors as its columns;
   scaling any components in the coefficient vector which cause a PRT to exceed a power spectral density requirement to generate a revised coefficient vector; and
   multiplying the span matrix with the revised coefficient vector to generate the time-domain compensation signal.

6. The method of claim 1, wherein the constructing a desired target signal comprises:
   clipping all samples of the data signal that exceed a predetermined threshold to a predetermined target; and
   setting all other samples to a zero value.

7. The method of claim 1, wherein the constructing a desired target signal comprises:
   setting all samples that do not exceed a predetermined threshold to a zero value to produce an intermediate desired target signal; and
   scaling the intermediate desired target signal by a scale factor to produce the desired target signal, wherein the scale factor is selected so that subtracting the desired target signal from the data signal reduces the PAR.

8. The method of claim 7, wherein the scale factor is selected to cause the desired target signal to meet power spectral density requirements.

9. An xDSL transmitter comprising:
   an inverse fast Fourier transform (IFFT);
   a cyclic prefix module;
   a re-sampler;
   a digital filter; and
   a peak-to-average power ratio (PAR) reduction module, wherein a symbol is converted into a data signal by being processed successively by the IFFT, the cyclic prefix module, the re-sampler and the digital filter and wherein the PAR reduction module predetermines a plurality of vectors generated from PAR reduction tones (PRT) by converting two out-of-phase symbols associated with each PRT into two separate vectors with the IFFT, the cyclic prefix module, the re-sampler and the digital filter, and wherein the PAR reduction module reduces the PAR in the data signal by constructing a time-domain compensation signal from the plurality of vectors and applying the time-domain compensation signal to the data signal.

10. The system of claim 9, wherein the two out-of-phase symbols comprise a sine symbol and a cosine symbol associated with the PRT.

11. The system of claim 9, wherein the PAR reduction module constructs the time-domain compensation signal by constructing a desired target signal wherein subtracting the desired target signal from the data signal results in a signal having a lower PAR than the data signal.

12. The system of claim 11, wherein the PAR reduction module constructs the time-domain compensation signal by further multiplying a projection matrix with the desired target signal to produce the time-domain compensation signal, wherein the projection matrix is generated from the plurality of vectors.

13. The system of claim 11, wherein the PAR reduction module constructs the time-domain compensation signal by further multiplying a pseudoinverse of a span matrix with the desired target signal to generate a coefficient vector having a plurality of components each corresponding to a PRT, wherein the span matrix has the plurality of vectors as its columns;
   scaling any components in the coefficient vector which cause a PRT to exceed a power spectral density requirement to generate a revised coefficient vector; and
   multiplying the span matrix with the revised coefficient to generate the time-domain compensation signal.

14. The system of claim 11, wherein the PAR reduction module constructs the desired target signal by clipping all samples of the data signal that exceed a predetermined threshold to a predetermined target; and
   setting all other samples to a zero value.

15. The system claim 11, wherein the PAR reduction module constructs the desired target signal by setting all samples that do not exceed a predetermined threshold to a zero value to produce an intermediate desired target signal; and
   scaling the intermediate desired target signal to produce the desired target signal by a scale factor, wherein the scale factor is selected so that subtracting the desired target signal from the data signal reduces the PAR.

16. A system for reducing peak-to-average power ratio (PAR) in a digital subscriber line system comprising:
   means for constructing a time-domain compensation signal from a plurality of vectors generated from PAR reduction tones (PRT), wherein each PRT generates two of the plurality of vectors, wherein the means for constructing a time-domain compensation signal comprises means for constructing a desired target signal wherein subtracting the desired target signal from the data signal results in a signal having a lower PAR than the data signal; and means for applying the time-domain compensation signal to a data signal after the data signal has been digitally filtered and re-sampled, wherein each vector in the plurality of vectors is generated from one of two out-of-phase symbols associated with a PRT, wherein the one of two out-of-phase symbols associated with the PRT is processed into a time-domain signal and digitally filtered and re-sampled to generate a corresponding vector.

17. The system of claim 16, wherein the two out-of-phase symbols comprise a sine symbol and a cosine symbol associated with the PRT.

* * * * *